United States Patent [19]

Rieth

[11] 4,141,169

[45] Feb. 27, 1979

[54] DEEP TROLLING APPARATUS

[76] Inventor: James E. Rieth, 2315 Okemos Dr., SE., Grand Rapids, Mich. 49506

[21] Appl. No.: 759,239

[22] Filed: Jan. 13, 1977

[51] Int. Cl.² ............................................. A01K 89/00
[52] U.S. Cl. .................................... 43/27.4; 242/106; 242/217; 43/4
[58] Field of Search .................................. 43/27.4, 4; 242/211–219, 106, 84.1 J, 84.5 A, 84.51 A, 84.21 R, 100, 100.1, 207, 96

[56] References Cited

U.S. PATENT DOCUMENTS

| | | | |
|---|---|---|---|
| 1,301,189 | 4/1919 | Steen | 242/96 |
| 2,344,209 | 3/1944 | Lowe | 242/84.4 R |
| 2,705,113 | 3/1955 | Bonanno | 242/84.21 R |
| 3,558,101 | 1/1971 | Ward | 242/100 X |
| 3,719,331 | 3/1973 | Harsch | 242/106 |
| 3,785,079 | 1/1974 | Rohn | 43/4 |
| 3,866,345 | 2/1975 | Gagnon | 43/4 |
| 3,916,555 | 11/1975 | Booth et al. | 43/27.4 |
| 3,922,808 | 12/1975 | Rieth et al. | 43/4 |
| 3,961,438 | 6/1976 | Henze et al. | 43/27.4 |
| 4,050,180 | 9/1977 | King | 43/4 X |

*Primary Examiner*—Edward M. Coven

*Attorney, Agent, or Firm*—Price, Heneveld, Huizenga & Cooper

[57] ABSTRACT

A deep trolling apparatus includes a pair of supports between which there is mounted a reel on which a trolling line is wound for paying out and retrieving the line. A slip clutch assembly couples the reel to a rotatable axle extending through the reel hub for providing an adjustable drag for the control line when the axle is held in a stationary position. In the preferred embodiment, the slip clutch assembly takes the form of a lubricious polymeric tapered bushing having slotted sidewalls and seated in a similarly tapered aperture formed in the hub of the reel with the bushing surrounding the axle. The bushing can be adjustably secured to the hub such that the gripping force between the interior surface of the bushing and the axle is varied for adjusting the drag. In one embodiment of the invention the reel axle is integral with a manually actuated crank arm for rotating the reel and one of the reel supports includes a locking member for selectively locking the arm in a fixed position. According to one aspect of the invention, a trolling line guide wheel mounted on an extension boom from the base of the reel supports includes a guide for assuring that the trolling line is maintained in the guide pulley.

15 Claims, 8 Drawing Figures

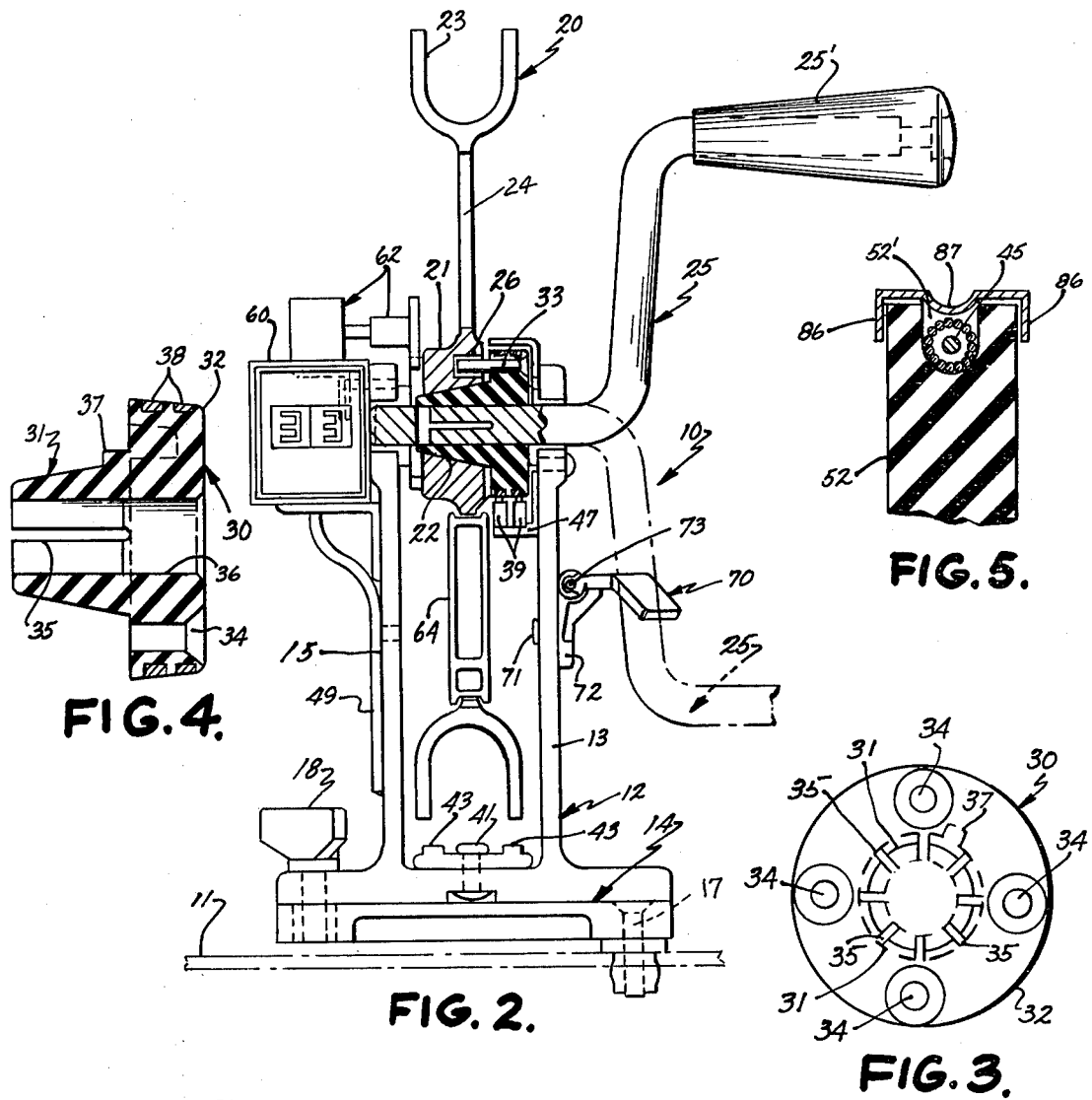
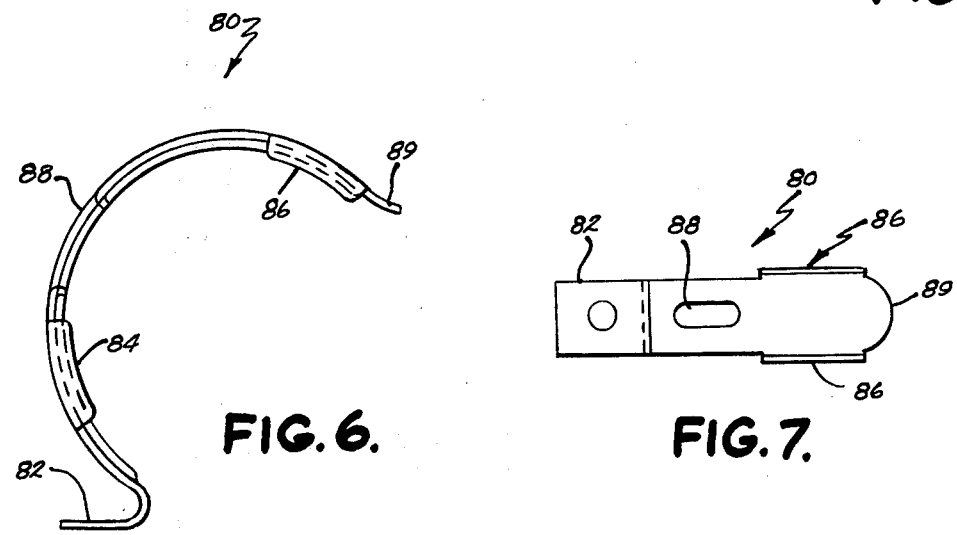

DEEP TROLLING APPARATUS

BACKGROUND OF THE INVENTION

The present invention relates to fishing apparatus and in particular relates to improvements in a deep trolling reel.

When trolling for fish in deep waters, a deep trolling reel is used and employs a relatively heavy weight for lowering a fishing lure to a depth where game fish are typically found. When at the desired depth, which in some cases is near the bottom of a lake; the weight and therefore the fishing lure is maintained at this desired depth as the line is drawn through the water. Not infrequently, the trolling weight snags on objects at or near the bottom of the lake or ocean causing the trolling line to break. In order to prevent this from occurring and still permit the fishing lure to be maintained at a desired depth, a slip clutch is desired which will permit the trolling line reel to rotate when a predetermined force less than the shearing force on the trolling line is applied to the line. This will prevent the line from breaking by providing some rotation of the reel in situations where the weight is snagged. As a result, the costly control line and weight affixed thereto will not be lost since the fisherman can typically reverse directions of the boat and free the weight and line.

Although some relatively complex clutch systems have been suggested; such arrangements typically are relatively complex and therefore expensive and failure prone. Some systems are exposed and therefore subject to jamming or interference by equipment being used in the area of the trolling reel. Also, when exposed, atmospheric conditions including salt spray or the like can deleteriously affect the unit.

SUMMARY OF THE INVENTION

It is the purpose of the trolling apparatus of the present invention to provide a unique slip clutch arrangement whereby a compressive bushing is mounted between the trolling reel and the axle such that a predetermined adjustable drag force can be provided when the axle is held in a stationary position. The bushing is internal to the mechanism therefore unexposed and represents a relatively inexpensive and durable solution to the problems encountered by the prior art. According to one aspect of the invention, a unique locking member is provided for locking the crank handle of a manually operated reel embodying the present invention. According to still a further aspect of the invention, a trolling line guide pulley positioned at the end of an arm extending from the trolling reel base includes a line guide holding the trolling line to the guide pulley during operation and thereby preventing entanglement of the trolling line. According to still a further aspect of the invention, there is provided a miniturized digital temperature readout display mounted to the reel support means providing the operator with a convenient display of the temperature of water at the fishing lure.

These and other objects, advantages and features of the present invention will be best understood by referring to the following description thereof in conjunction with the accompanying drawings in which:

BRIEF DESCRIPTION OF THE DRAWINGS

FIG. 2 is a left end elevational view partly in cross section of the trolling apparatus shown in FIG. 1;

FIG. 3 is an enlarged end elevational view of the slip clutch bushing shown in FIG. 2;

FIG. 4 is a cross-sectional view of the bushing shown in FIG. 3;

FIG. 5 is an enlarged fragmentary cross-sectional view of the trolling line guide pulley and guide therefor;

FIG. 6 is an enlarged side elevational view of the line guide;

FIG. 7 is a top plan view of the line guide shown in FIG. 6; and

DETAILED DESCRIPTION OF THE PREFERRED EMBODIMENT

Figure 1:
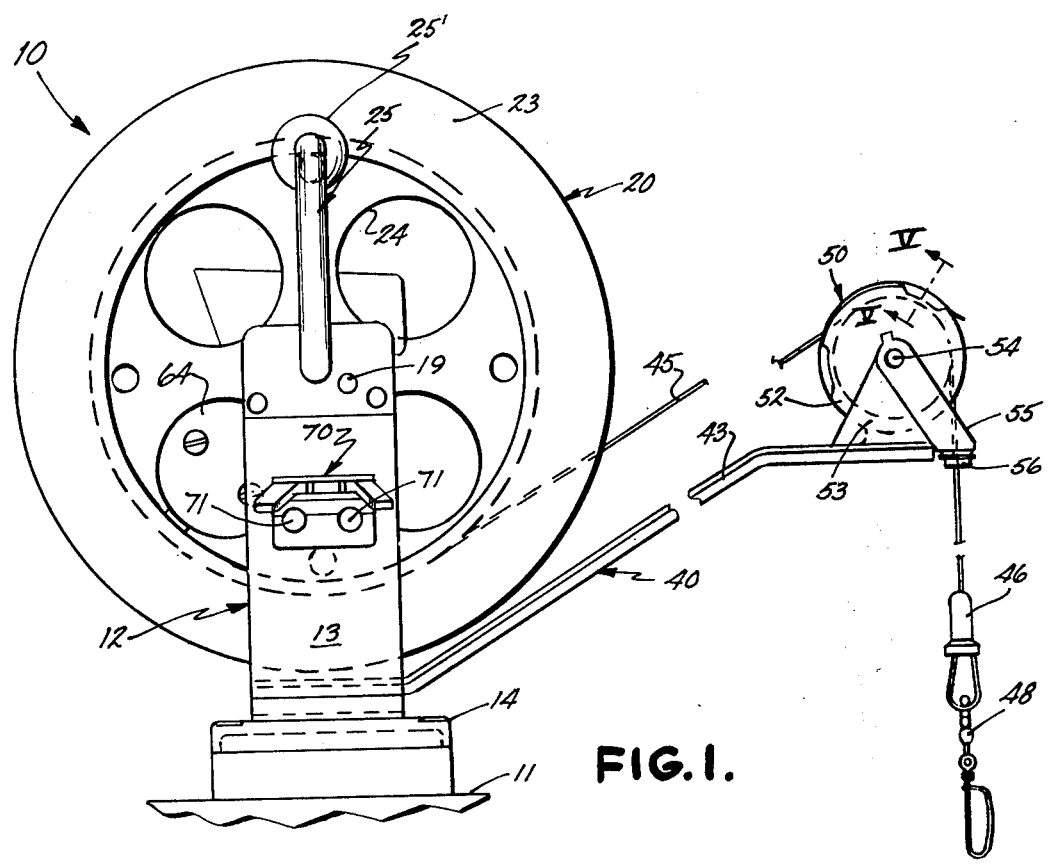
FIG. 1 is a right side elevational view of a trolling apparatus embodying the present invention.

Referring initially to FIGS. 1 and 2, there is shown a reel assembly 10 including a frame 12 to which there is rotatably mounted a line reel 20 and a reel drive 25 which in the preferred embodiment comprises a manually operated crank handle. The frame 12 includes a base 14 to which there is integrally formed a pair of spaced vertically and upwardly extending supports 13 and 15. The base is adapted to be removably secured to a deck plate 14 by means of a thumb screw 18. The deck plate in turn is secured to the transom 11 or gunwale of the boat by means of a plurality of screws 17 (FIG. 2). This mounting arrangement permits easy removal of the trolling reel apparatus from the boat when not in use.

The reel assembly 10 further includes a flexible action arm 40 secured to the base 14 between arms 13 and 15 by rivet means 41 seen in FIG. 2. Arm 40 extends outwardly and upwardly from the base and supports at its end remote from base 12 a line guiding assembly 50 described in greater detail below. In the preferred embodiment, the action arm 40 comprises an extruded aluminum member having a pair of spaced ridges 43 to provide the desired stiffly resilient property for the trolling apparatus. A control line 45 which in the preferred ebodiment comprises a coaxial cable (FIG. 5) is wound about reel 20 and extends through guide member 50 coupled at its free end to a suitable temperature responsive electrical device such as a thermister 46. A swivel snap 48 is coupled to the thermister for attaching a trolling weight (not shown) to the end of trolling line 45. Also a release clip (not shown) can be rotatably attached near the end of line 45 to provide a releasable holding means for a separate fishing line as is well known. In some embodiments of the invention where the temperature monitoring feature is not employed, naturally the trolling line 45 need not be a conductor but of any suitable line for supporting the trolling weight attached thereto by means of snap 48. Having briefly described the overall reel assembly, a detailed description of the apparatus and its operation is now presented.

Line reel 20 includes a central hub 21 having formed therethrough at its center, a tapered aperture 22 defining a camming surface for receiving a compressive bushing 30, the combination of which defines a slip clutch arrangement for the trolling reel. Reel 20 includes at its periphery a channel defining line supporting perimeter 23 coupled to the hub 21 by means of an apertured disc plate 24 with a plurality of apertures 24' formed therein to reduce the weight and material costs of the reel. The hub 21 further includes a plurality of threaded apertures 26 for receiving the mounting screws 33 for compressive bushing 30 to adjustably secure the reel hub 21 to the axle 25 and then the drag of the slip clutch assembly.

The compressive bushing 30 comprises a generally annular member having a mounting flange 32 at one end with four equally spaced axially extending apertures 34. Screws 33 extend through apertures 34 into the threaded apertures 26 of the reel hub to secure busing 30 to reel 20. Extending axially through the center of bushing 30 is a reel shaft aperture 36 receiving the end of crank handle 25 which defines the axle for the reel 20. Extending from mounting flange 32 of bushing 30 is a projection 31 having a tapered external surface corresponding generally to the taper of aperture 22 formed in the reel. Projection 31 includes a plurality of longitudinally extending and spaced slots 35 permitting the deflection of the legs 31' of projection 31 between such slots against shaft 25 as the bushing 30 is progressively forced within the correspondingly tapered aperture 22 of the reel by the tightening of screws 33. A key 37 is formed at the junction of projection 31 and flange 32 and fits in a corresponding keyway (not shown) in reel 22 to assure proper alignment of the compressive bushing 30 to the reel. Reel 20 is made of any suitable structurally rigid material such as aluminum or a molded polymeric material such as polyvinyl chloride or ABS plastic. The compressive bushing 30 is made of a lubricious resilient polymeric material and in the preferred embodiment is injection molded of ABS plastic to provide the desired flexibility of the legs 31' between slots 35 and an adjustable slip fit between axle 25 and the interior surface of aperture 36 on the inner surface of the projection legs.

In order to provide adjustment of the slip clutch between the reel and shaft 25 so formed, there is provided an aperture 19 (FIG. 1) extending through support 13 permitting access to the screws 33 once the reel is assembled. Naturally supports 13 and 15 include suitable apertures as seen in FIG. 2 for the admission of the axle 25 therethrough and into the reel and clutch assembly during manufacturing of the apparatus. In the preferred embodiment of the invention the slip clutch so formed provides with handle 25 locked by means 70 described below, a fully adjustable drag ranging from about 2 pounds to at least 100 pounds and factory set at 50 pounds for a trolling line with a breaking strength of 150 pounds.

In the preferred embodiment shown, bushing 30 serves the further function of providing commutating rings comprising a pair of spaced conductive strips 38 deposited in peripheral channels formed in the molded bushing as best seen in FIG. 4. Strips 38 can be of any suitable conductive material such as copper, silver or the like which is either bonded or deposited by vacuum deposition on the periphery of the bushing in a conventional manner. Engaging the strips is a pair of wiper arms 39 (FIG. 2) mounted on the interior wall of support 13 by an L-shaped insulative bracket 47 such that the spring loaded contacts of wiper arms 39 engage the conductive strips 38 of the bushing 30. Naturally, the strips 38 are sufficiently wide to maintain the contact relationship between wiper arms 39 and the strips for the required axial adjustment of bushing 30 within aperture 22 such that an electrical contact is maintained for different adjustments of the slip clutch.

A conductor 49 is suitably coupled to contacts 39 and extends to a digital temperature readout circuit 60 mounted to leg 15 of the reel assembly by means of a bracket 62. Bushing 30 and reel hub 21 include apertures therethrough permitting the extension of line 45 therethrough and into an electrical contact with strips 38 through a disconnect assembly 64, the structure of which is disclosed in detail in U.S. Pat. No. 3,916,555 issued Nov. 4, 1975, the disclosure of which is incorporated herein by reference. The digital temperature readout 60 can be of the type also disclosed in my copending U.S. patent application Ser. No. 623,732, filed Oct. 20, 1975 entitled TROLLING APPARATUS, the disclosure of which is also incorporated herein by reference.

In order to employ the unique slip clutch arrangement when using the trolling apparatus of the present invention, it is necessary to lock the crank arm 25 into position once the trolling line has be extended to position the attached lure at the desired depth. It is noted that the crank arm 25 includes a first horizontal segment to which a handle 25' is secured, a middle section extending generally perpendicularly to handle 25 and a second horizontal segment defining the reel axle. For this purpose, a flipdown locking assembly 70 shown in FIGS. 1 and 2 is employed and is now described.

Figure 8:
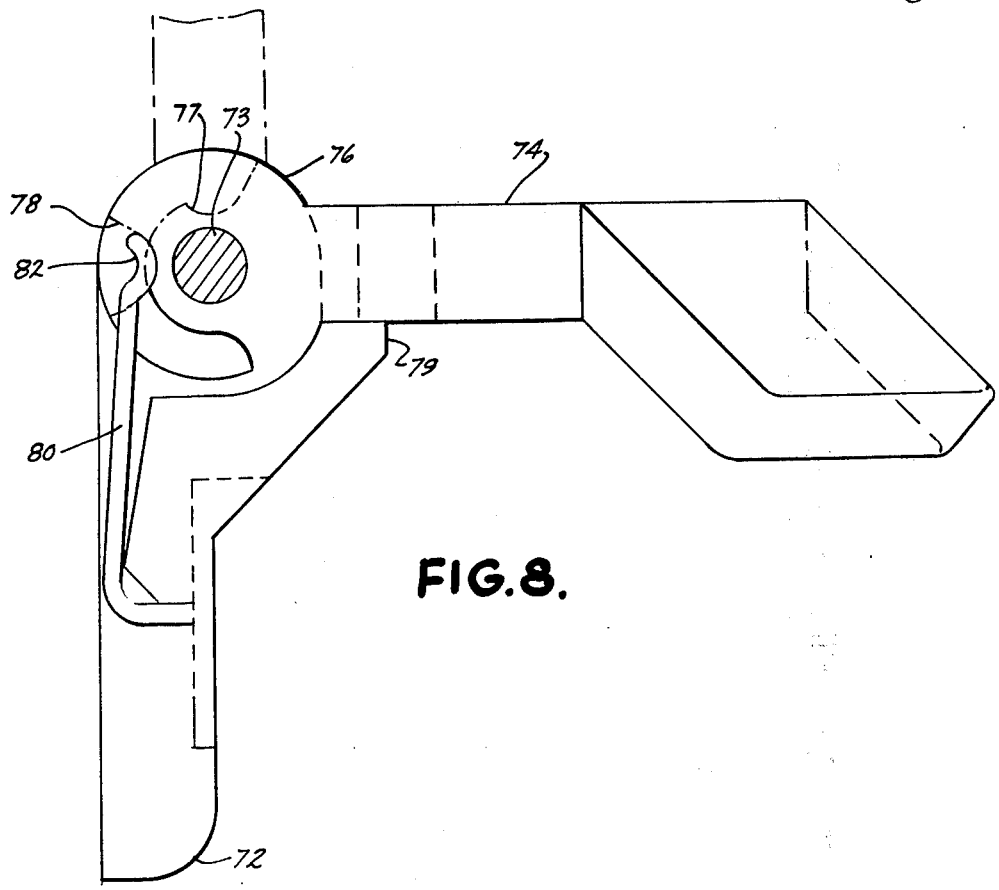
FIG. 8 is an enlarged side elevational view of the handle locking means.

The locking assembly 70 (FIGS. 1, 2 and 8) includes a mounting bracket 72 secured to support member 13 by rivets 71 or other fastening means. The bracket supports axle 73 on which there is rotatably mounted a pair of spaced locking arms 74 having at their ends remote from axle 73 a pair of outwardly and downwardly projecting flanges 75. Arms 74 are integrally attached to a cylindrical cam 76 surrounding axle 73 and rotatably mounted thereto. Cam 76 includes a pair of detents 77 and 78 for holding the spaced arms 74 in an upward position permitting free rotation of crank arm assembly 25 or downwardly as shown in FIG. 2 locking the crank arm in stationary position between the spaced arms 74 as shown in phantom form. The mounting bracket 72 includes a horizontal stop 79 cooperating with a biasing leaf spring 80 having a detent engaging end 82 for holding the arms 74 in a generally horizontal locking position. Thus, once the trolling line has been lowered into the water to the desired depth which can be selected as a function of water temperature for a desired species of fish, the locking assembly 70 is flipped down to hold crank arm 25 between its locking arm 74. In this position, should the control line or its attached weight become snared, the slip clutch arrangement including compressive bushing 30 will permit the trolling line to pay out by permitting rotation of the reel and attached bushing on axle 25 even though the axle is locked in position at a predetermined drag selected and adjusted by the operator by the adjustment of screws 33 holding the bushing to the reel. With arms 24 flipped to the upward position end 82 of spring 80 engages detent 77 holding the locking assembly in an unlocked position permitting free rotation of the reel.

When paying out the trolling line through the guide assembly 50, if a conventional guide pulley is employed, it is possible particularly at high rates of line feed for the control line to become entangled around the pulley and leave the pulley's guiding peripheral groove. In order to prevent such entanglement, an improved wire guide assembly 50 is employed and is now described.

Assembly 50 includes a conventional pulley 52 mounted on an axle 54 extending between a pair of spaced triangular supports 53 integral with a bracket secured to the top surface and end of flexible arm 40. Surrounding axle 54 is a pivoted bushing arrangement including a pair of spaced arms 55 between which there is provided a line bushing 56 through which the trolling line 45 extends. As the angle of the line 45 is varied when payed out or retrieved, the pivot arms 55 and bushing 56 are permitted to pivot about axle 54 to accommodate the line angle changes.

In order to hold the trolling line within the peripheral groove of pulley 52, the line guide shown in detail in FIGS. 5-7 is employed. As seen in FIG. 6, the line guide comprises a stamped metal or molded plastic semi-circular member 80 including an apertured mounting tab 82 at one end for securing the guide to the arm 40 of the trolling apparatus. The guide includes two pairs of integral downwardly projecting legs 84 and 86 which overlie, in spaced relationship, the edges of pulley 52 as best seen in FIG. 5 providing lateral stability to the line guide along the periphery of the pulley. Formed integrally along the center portion of the guide is an indentation 87 tending to constrict cable 45 within the peripheral channel 52' of the pulley as best seen in FIG. 5. An aperture 88 formed through the top of guide 80 permits line 45 to extend into the pulley channel 52' from the left side as seen in FIG. 1. The tip 89 of the line guide is rounded and deflected outwardly as best seen in FIGS. 6 and 7 permitting the line angle to change freely without interference. The line guide so formed therefore prevents the trolling line 45 from jumping the guide pulley 52 and yet provides the desired free movement of the trolling line through the guide assembly at the end of the support arm 40.

It will become apparent to those skilled in the art that various modifications to the present invention can be made. Such modifications may, for example, include an electrical drive arrangement as disclosed in the above-identified patent and by which the manual crank arm assembly 25 is eliminated and an electrical drive motor is mounted to the support member 13. The drive shaft of the motor extends through the compressive bushing 30 which otherwise operates in a manner identical to that of the preferred embodiment described. These and other modifications to the present invention will, however, fall within the scope and spirit of the present invention as defined by the appended claims.

The embodiments of the invention in which an exclusive property or priviledge is claimed are defined as follows:

1. In a trolling apparatus including a trolling reel rotatably mounted to support means, and drive means for the reel, an improved slip clutch comprising:
   said reel including a tapered bushing receiving aperture formed therein and said drive means including an axle; and
   a single compressive bushing having an exterior surface tapered to mate with said tapered aperture of said reel, said bushing secured within said reel for rotation therewith and including a centrally extending cylindrical aperture defining a frictional bearing surface against said axle, said axle extending through said cylindrical aperture of said bushing, and wherein said bushing is axially adjustable with respect to said reel for providing a predetermined selectable drag for said reel when said axle is held stationary.

2. The apparatus as defined in claim 1 wherein said bushing includes a mounting flange for mounting said bushing to said reel and a projection extending from said flange wherein said projection includes a plurality of notches extending longitudinally through said projection for defining arms between said notches and wherein said tapered exterior surface is formed on the exterior of said projection.

3. The apparatus as defined in claim 2 wherein said bushing is made of a resilient polymeric material.

4. The apparatus as defined in claim 3 and further including an arm extending from the support means and including a trolling line guide pulley at the end of said arm remote from the support, and a line guide comprising a curved member mounted at one end to said arm and circumscribing a portion of said guide pulley to maintain a trolling line within said pulley.

5. The apparatus as defined in claim 4 wherein the drive means for said reel includes a manually operated crank arm coupled to said axle and said apparatus further including locking means extending between the reel support and said crank arm and including a pair of spaced locking arms coupled to rotatable cam means and bias means engaging said cam means for holding said spaced locking arms in a first position in which said arms engage opposite sides of said crank arm to lock said axle in position and a second position in which said arms and cam means are rotated such that said arms clear said crank arm permitting free rotation of said axle.

6. The apparatus as defined in claim 5 wherein the trolling line employed with said reel is an electrical conductor including a temperature responsive detector coupled at one end, a digital temperature readout circuit mounted to the reel support means and means for coupling the opposite end of said electrical conductor to said readout circuit.

7. The apparatus as defined in claim 6 wherein said coupling means includes a pair of spaced slip rings supported by and surrounding said flange of said bushing and coupled to said electrical conductor and contact means insulatively mounted to said support means for contacting said slip rings and electrically coupled to said readout circuit.

8. For use in a trolling apparatus including a guide pulley mounted to an arm extending from the trolling apparatus for guiding the trolling line, a line guard comprising:
   a curved member including an apertured mounting tab disposed at a first end of said curved member, a single fastener engaging said apertured mounting tab and securing the same to the arm such that said curved member circumscribes at least a portion of the channel of the guide pulley, said curved member closely conforming to the periphery of the pulley to retain the trolling line in the channel of the guide pulley, said curved member including a longitudinally extending centered indentation formed therein which projects into the channel of the guide pulley for holding the trolling line within the pulley channel, said curved member including an aperture permitting the trolling line to extend between the guide pulley and said curved member, tab means extending from opposite sides of said curved member to overlie the sides of the guide pulley in spaced relationship for providing lateral alignment and stability between said curved member and the guide pulley, whereby said line guard prevents jumping of said trolling line from the channel of the guide pulley yet provides for the free angular movement of the trolling line exiting said line guard.

9. A trolling apparatus comprising:

reel support means including a base and a pair of upwardly extending spaced support arms;

an axle rotatably extending between and supported by said support arms;

drive means coupled to said axle;

a trolling reel positioned between said support arms and including a hub having an aperture formed through said hub with a tapered surface; and a compressive bushing having a tapered exterior surface mating with said tapered surface of said hub, said bushing having a cylindrical aperture defining a frictional bearing surface, said bushing mounted to said hub and axially adjustable with respect to said hub with said axle extending through said cylindrical aperture to adjustably urge said bushing against said axle for providing predetermined slippage for said reel on said axle.

10. The apparatus as defined in claim 9 wherein said bushing includes a mounting flange for mounting said bushing to said reel and a projection extending from said flange wherein said projection includes a plurality of notches extending longitudinally through said projection for defining arms between said notches and wherein said tapered exterior surface is formed on the exterior of said projection.

11. The apparatus as defined in claim 10 wherein said bushing is made of a resilient polymeric material.

12. The apparatus as defined in claim 11 wherein sid bushing flange is round and includes a pair of spaced conductive slip rings formed around the outer cylindrical surface of said flange for coupling to a conductive trolling line and conductive arms positioned on said real support means to pick off electrical signals applied to said slip rings by said trolling line.

13. The apparatus as defined in claim 14 wherein the trolling line is a conductor having coupled at one end a thermister and coupled at its opposite end to said slip rings, and wherein said apparatus includes a digital temperature readout circuit mounted to one of said support arms and coupled to said conductive arms.

14. The apparatus as defined in claim 9 and further including an action arm mounted to and extending outwardly from said base and including at an end remote from said base a guide pulley for guiding trolling line payed out and retrieved by said reel, and a line guard comprising:

a curved member including a mounting tab for securing said member to the arm such that said curved member circumscribes at least a portion of the channel of the guide pulley, said member including an aperture permitting the control line to extend between the guide pulley and said member, and tab means extending from opposite sides of said member to overlie the sides of the guide pulley in spaced relationship for providing lateral alignment and stability between said member and the guide pulley.

15. The apparatus as defined in claim 14 wherein said curved member includes a longitudinally extending centered indentation formed therein which projects into the channel of the guide pulley for holding the trolling line within the pulley channel.

* * * * *

UNITED STATES PATENT AND TRADEMARK OFFICE
CERTIFICATE OF CORRECTION

PATENT NO. : 4,141,169
DATED : February 27, 1979
INVENTOR(S) : James E. Rieth

It is certified that error appears in the above-identified patent and that said Letters Patent are hereby corrected as shown below:

Column 2, line 41:

"ebodiment" should be --embodiment--.

Column 3, line 8:

"busing" should be --bushing--.

Column 8, Claim 13, line 3:

"14" should be --12--.

Signed and Sealed this

Tenth Day of July 1979

[SEAL]

Attest:

Attesting Officer

LUTRELLE F. PARKER
Acting Commissioner of Patents and Trademarks